H. W. MORSE.
PROCESS FOR THE EXTRACTION OF COPPER FROM ITS ORES.
APPLICATION FILED FEB. 27, 1917.
1,288,121. Patented Dec. 17, 1918.
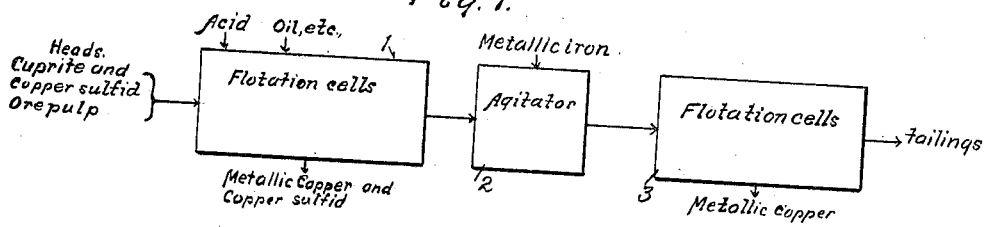
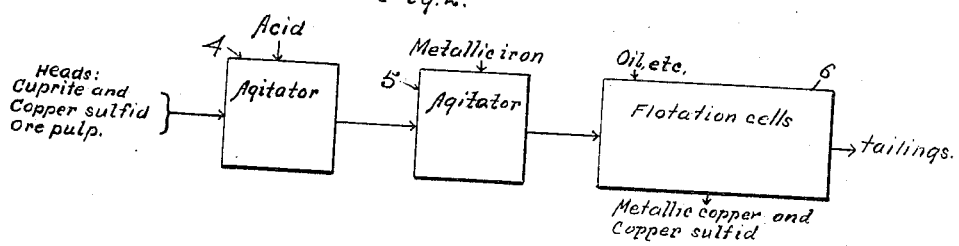
Inventor:
Harry W. Morse
by Arthur P. Wright
Atty

UNITED STATES PATENT OFFICE.

HARRY W. MORSE, OF LOS ANGELES, CALIFORNIA, ASSIGNOR TO CHINO COPPER COMPANY, OF HURLEY, NEW MEXICO, A CORPORATION OF MAINE.

PROCESS FOR THE EXTRACTION OF COPPER FROM ITS ORES.

1,288,121.    Specification of Letters Patent.    Patented Dec. 17, 1918.

Application filed February 27, 1917. Serial No. 151,194.

*To all whom it may concern:*

Be it known that I, HARRY W. MORSE, a citizen of the United States, residing at Los Angeles, in the county of Los Angeles, State of California, have invented a new and useful Process for the Extraction of Copper from Its Ores, of which the following is a specification.

This invention relates especially to the extraction of copper from mixed ores containing copper both as sulfid and as cuprite, with or without native copper and with or without the presence of copper in the form of other oxidized minerals, such as carbonates or silicates. It enables good recoveries to be made of the copper present in the ore in all these forms, and is especially economical in the use of reagents as compared with other methods which have been used for the treatment of such ores.

Ores containing only sulfid minerals can be successfully and economically concentrated by tabling and flotation methods. Ores containing only oxidized minerals which are easily soluble in usual solvents, such as sulfuric acid, can be successfully treated by dissolving the copper in sulfuric acid or other solvent, separating the solution from the ore pulp, and recovering the copper from the clear solution by well known methods, such as precipitation on iron as cement copper, or electrolytic deposition.

In the case of mixed ores containing both sulfid and oxidized copper minerals including cuprite, neither gravity concentration, flotation nor the usual leaching methods give satisfactory recoveries. My process is designed for use with such ores containing cuprite, and the main object of the present invention is to provide for recovery of the copper from such ores with minimum expense for reagents. It has been proposed to recover the copper from such mixed oxidized and sulfid ores by subjecting the ore pulp to the action of dilute sulfuric acid to dissolve oxidized copper, then precipitating such copper, in metallic form, by a reducing agent, and then recovering the precipitated copper by flotation, together with undissolved copper sulfid. I have discovered that when cuprite is present in the ore, a portion of the copper contained therein separates as metallic copper and may be recovered in the flotating operation, along with the precipitated copper and the copper sulfid, and by taking advantage of this fact, I am enabled to effect an economy in the amount of reducing agent used.

My process may be carried out substantially as follows:

The finely divided ore is treated with sulfuric acid in dilute water solution. This dissolves the carbonates, silicates and similar soluble copper minerals. At the same time any cuprite which is present in the ore is decomposed according to the following reaction:

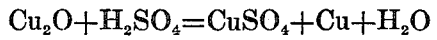

$$Cu_2O + H_2SO_4 = CuSO_4 + Cu + H_2O$$

One half of the copper in the cuprite goes into solution as copper sulfate and one half separates as metallic copper, remaining in the pulp.

After treatment with the dilute sulfuric acid the entire pulp is subjected to agitation in the presence of metallic iron and copper is precipitated from solution as cement copper in the pulp.

In the dissolving of the carbonates and silicates of copper, one equivalent of sulfuric acid must be used for each equivalent of copper dissolved. In the reaction with the cuprite of the ore, only one-half of an equivalent of sulfuric acid is required for each equivalent of copper acted upon.

The accompanying drawings are flow sheets of apparatus for carrying out my invention, and referring thereto:

Figure 1 is a flow sheet for the first method, hereinafter described, and Fig. 2 is a flow sheet for the second method.

The mineral values may be recovered from the pulp by either of the following methods:

First method: Sulfids and metallic copper may be recovered by frothing flotation during the reaction with sulfuric acid of the oxidized minerals of the ore. To effect this, a flotation oil or flotation agents are added to the ore pulp either before or after the addition of acid or simultaneously with such addition, and the reaction with the oxidized minerals is produced in cells similar to those used in flotation operation, such cells serving as agitators to promote solution of the carbonates, silicates, etc., and reaction with the cuprite as described above. These cells also permit simultaneous leaching with acid and flotation of sulfid minerals, together with any metallic copper which may have been present in the ore or produced from cuprite.

After leaving the first set of flotation cells, in which simultaneous leaching and flotation is being carried out, the entire pulp is passed through an agitating machine or precipitator, in which the entire pulp, with its solution content, is brought into contact with metallic iron in the form of shot or scrap or otherwise finely divided. In this step the copper in solution is precipitated as metallic (cement) copper. The entire pulp passing from the precipitator is then again subjected to flotation in a second flotation cell or set of cells in which cement copper which has been produced by the action of the iron, any remaining metallic copper from the ore or resulting from the decomposition of the cuprite by acid, as shown by the above reaction, and any remaining sulfid minerals, are recovered by frothing flotation.

Second method: Leaching as described above under "first method" may be carried out in any convenient agitating device, such as a mechanical or air agitator or in cells similar to those used in flotation operation, without, however, removing any mineral concentrate at this stage of the process. The pulp is then passed over scrap iron or shot iron in a machine adapted to agitate the mixture and precipitate copper from solution as finely divided (cement) copper. The entire pulp, containing sulfids and metallic copper as mineral values, is then subjected to flotation, using for example, any suitable flotation agent, such as oil and any suitable flotation machine. The natural sulfids are recovered in this way, together with any metallic copper which may have been present in the ore and any metallic copper which has been produced, either by decomposition of the cuprite or by precipitation from solution on metallic iron.

The flotation or frothing agent, such as oil, may be introduced into the pulp at any convenient stage of the operation, for example, during the grinding of the ore with water to form a pulp, during the reaction of the sulfuric acid with the ore, or into the pulp before it passes to the precipitator, or during or after the precipitation, or before or during the final flotation.

The special advantage of this process in the case of ores containing cuprite lies in the economy of acid used for leaching and in the economy of iron used for precipitation. On a pure cuprite ore, only half the copper is dissolved as copper sulfate and precipitated by iron. The other half of the copper is produced in metallic form during the leaching operation and is recovered during flotation without additional expense for flotation agents, power for operating machinery or labor for repairs or attendance.

What I claim is:—

1. The process of treating ores containing cuprite, which consists in treating the finely ground ore with sulfuric acid in amount corresponding to substantially one-half of the copper in the cuprite, thereby separating metallic copper in part from the cuprite present and dissolving the remainder of the copper in the cuprite as sulfate, precipitating dissolved copper from solution as metallic copper by a reducing agent, and subjecting the resulting mixture to flotation.

2. The process of recovering copper from ores containing cuprite, together with copper sulfid, which consists in subjecting the ore to the action of dilute sulfuric acid corresponding in amount to substantially one-half of the copper in the cuprite, whereby a part of the copper of the cuprite is dissolved and another part is separated as metallic copper, precipitating the dissolved copper by a reducing agent and separating metallic and sulfid copper values from the gangue by flotation.

3. The process of recovering copper from ores containing cuprite, together with other oxidized copper minerals and with copper sulfid, which consists in treating the ore with dilute sulfuric acid, to separate part of the copper of the cuprite as metallic copper and to dissolve another part thereof, together with copper of the other oxidized minerals, subjecting the resulting pulp to flotation to separate therefrom the metallic copper and sulfid values, then precipitating the dissolved copper in metallic form by a reducing agent and recovering the metallic copper and remaining copper sulfid from the resulting pulp, by flotation.

In testimony whereof I have hereunto set my hand, at Hurley, New Mexico, this 16th day of February, 1917.

HARRY W. MORSE.